United States Patent
Patel et al.

(10) Patent No.: US 10,484,878 B2
(45) Date of Patent: Nov. 19, 2019

(54) MIXED-ACCESS MODE COMMUNICATION FOR STANDALONE OPERATION ON A SHARED COMMUNICATION MEDIUM

(71) Applicant: QUALCOMM Incorporated, San Diego, CA (US)

(72) Inventors: Chirag Sureshbhai Patel, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/705,252

(22) Filed: Sep. 14, 2017

(65) Prior Publication Data

US 2018/0084430 A1 Mar. 22, 2018

Related U.S. Application Data

(60) Provisional application No. 62/395,487, filed on Sep. 16, 2016.

(51) Int. Cl.
*H04W 16/14* (2009.01)
*H04W 72/04* (2009.01)
(Continued)

(52) U.S. Cl.
CPC ....... *H04W 16/14* (2013.01); *H04W 72/0446* (2013.01); *H04W 74/08* (2013.01); *H04L 5/0007* (2013.01); *H04W 76/15* (2018.02)

(58) Field of Classification Search
CPC ..... H04W 16/14; H04W 88/08; G01S 5/0236; H04L 5/0053
(Continued)

(56) References Cited

U.S. PATENT DOCUMENTS

2015/0281974 A1* 10/2015 Ghasemzadeh ....... H04W 16/14
455/454
2015/0351118 A1* 12/2015 Arnott ................... H04W 16/14
370/252
(Continued)

FOREIGN PATENT DOCUMENTS

EP 2378702 A2 10/2011
EP 3242502 A1 11/2017
(Continued)

OTHER PUBLICATIONS

International Search Report and Written Opinion—PCT/US2017/051810—ISA/EPO—dated Nov. 23, 2017.

*Primary Examiner* — Kiet M Doan
(74) *Attorney, Agent, or Firm* — Liem T. Do

(57) ABSTRACT

In an embodiment, a central coordination server (e.g., a Spectrum Access Server) partitions a shared communication medium into a contention-free partition where the shared communication medium is reserved for devices associated with a first set of operators and a contention-based partition where devices associated with a second set of operators contend for access to the shared communication medium, at least one operator belonging to both the first and second sets of operators. The central coordination server notifies target devices (e.g., APs, ATs, etc.) of the partitioning. In a further embodiment, a device (e.g., AP, AT, etc.) communicates over a portion of the contention-free partition that is reserved for an associated operator, and also over the contention-based partition.

26 Claims, 11 Drawing Sheets

(51) Int. Cl.
*H04W 74/08* (2009.01)
*H04W 76/15* (2018.01)
*H04L 5/00* (2006.01)

(58) Field of Classification Search
USPC ... 455/450, 454, 436, 418, 67.13, 62, 404.2, 455/513; 370/331, 252, 329, 474, 392, 370/445, 201, 468
See application file for complete search history.

(56) References Cited

U.S. PATENT DOCUMENTS

| | | | | |
|---|---|---|---|---|
| 2016/0094965 | A1* | 3/2016 | Sennett | H04W 4/22 455/404.1 |
| 2017/0251467 | A1* | 8/2017 | Dame | H04W 4/38 |

FOREIGN PATENT DOCUMENTS

| | | | |
|---|---|---|---|
| WO | 2009103841 | A1 | 8/2009 |
| WO | 2016107281 | A1 | 7/2016 |

\* cited by examiner

MIXED-ACCESS MODE COMMUNICATION FOR STANDALONE OPERATION ON A SHARED COMMUNICATION MEDIUM

CROSS-REFERENCE TO RELATED APPLICATIONS

The present application claims the benefit of U.S. Provisional Application No. 62/395,487, entitled "MIXED-ACCESS MODE COMMUNICATION FOR STANDALONE OPERATION ON A SHARED COMMUNICATION MEDIUM," filed Sep. 16, 2016, assigned to the assignee hereof and expressly incorporated herein by reference in its entirety.

BACKGROUND

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell operations have been extended into so-called "unlicensed" and "lightly licensed" frequency spectra, for example, such as the Unlicensed National Information Infrastructure (U-NII) band and the Citizens Broadband (CB) Radio Service band. This extension of small cell operation is designed to increase spectral efficiency and hence overall system capacity. However, it may also lead to varying degrees of interference between small cell operators as their devices compete for access to shared resources.

SUMMARY

An embodiment is directed to a method of operating a central coordination server for a shared communication medium, including partitioning the shared communication medium into a contention-free partition where the shared communication medium is reserved for first devices associated with a first set of operators and a contention-based partition where second devices associated with a second set of operators contend for access to the shared communication medium, at least one operator belonging to both the first and second sets of operators, and notifying the first and second devices of the partitioning.

Another embodiment is directed to a method, including communicating, by a device associated with an operator, over a contention-free partition of a shared communication medium that is reserved for the operator, and communicating, by the device associated with the operator, over a contention-based partition of the shared communication medium that is shared with a plurality of operators.

Another embodiment is directed to a central coordination server for a shared communication medium, including a controller coupled to a network communication interface and configured to partition the shared communication medium into a contention-free partition where the shared communication medium is reserved for first devices associated with a first set of operators and a contention-based partition where second devices associated with a second set of operators contend for access to the shared communication medium, at least one operator belonging to both the first and second sets of operators, and notify the first and second devices of the partitioning.

Another embodiment is directed to a device associated with an operator, including at least one communication controller coupled to at least one transceiver and configured to communicate over a contention-free partition of a shared communication medium that is reserved for the operator, and communicate over a contention-based partition of the shared communication medium that is shared with a plurality of operators.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to mixed-access mode communication on a shared communication medium. To more efficiently mitigate interference between devices belonging to different operators, a central coordination controller or the like may partition the communication medium into a contention-free partition in which devices without Over-The-Air (OTA) co-existence mechanisms such as Listen Before Talk (LBT) may be deployed and a contention-based partition in which devices that do have OTA-contention capabilities may be deployed. To take advantage of the benefits of both, and increase spectral efficiency overall, some operators may be deployed so as to occupy resources in both the contention-free partition and the contention-based partition. For example, an access point and access terminal of a given operator may communicate via a Primary Cell (PCell) deployed on the contention-free partition and via one or more Secondary Cells (SCell(s)) deployed on the contention-based partition. Each of the cells may operate in accordance with a Time Division Duplex (TDD) configuration in the time domain, with the TDD configuration of the one or more SCell(s) being fixed to that of the PCell or adaptive depending on the frequency separation between the contention-free partition and the contention-based partition.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
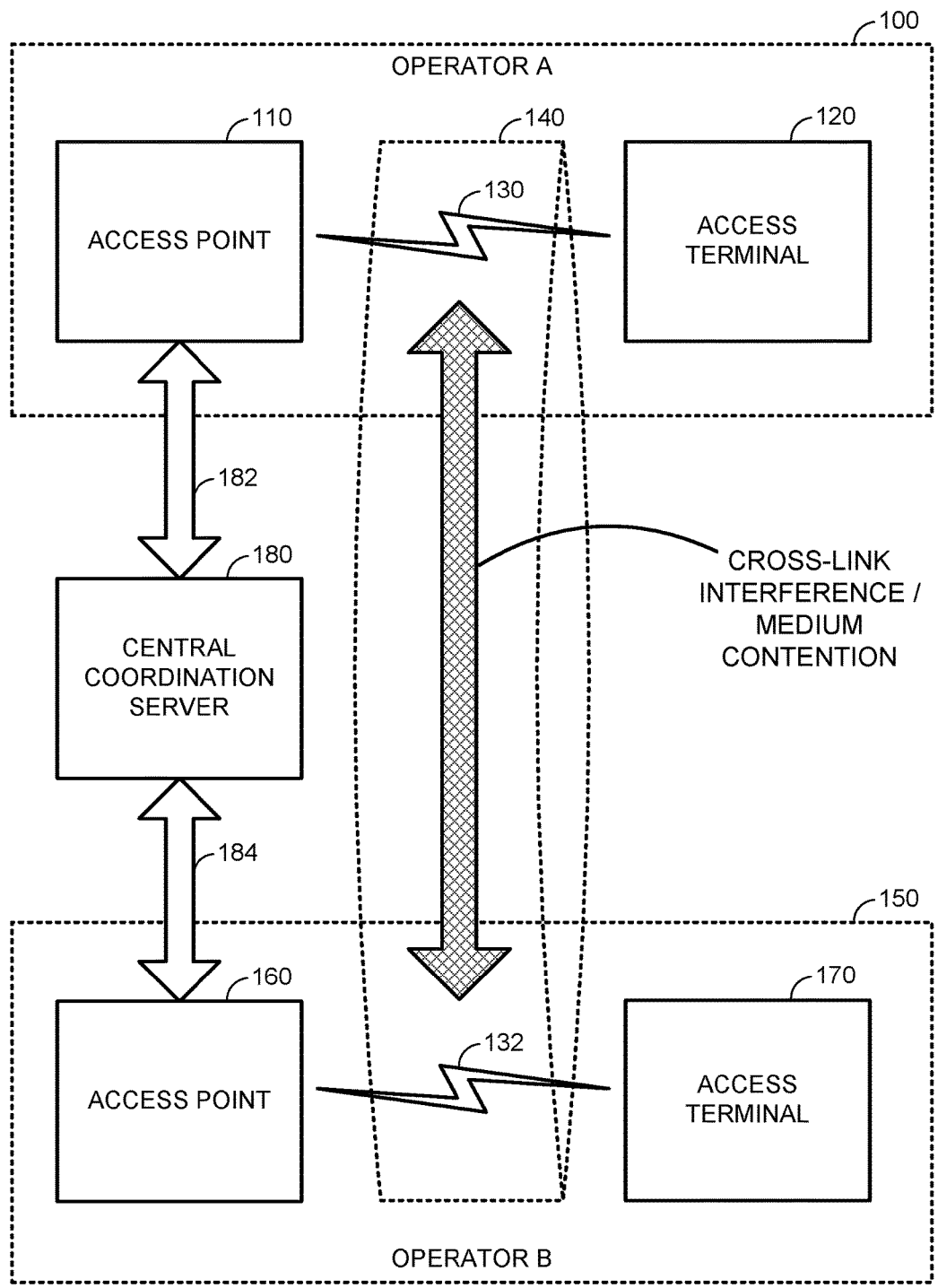
FIG. 1 is a system-level diagram illustrating an example wireless network environment.

FIG. 1 is a system-level diagram illustrating an example wireless network environment, shown by way of example as including systems from two operators, a first operator A system 100 and a second operator B system 150. Each system may be composed of different wireless nodes generally capable of receiving and/or transmitting over a wireless link, including information related to various types of communication (e.g., voice, data, multimedia services, associated control signaling, etc.). The operator A system 100 is shown as including an access point 110 and an access terminal 120 in communication with each other over a wireless link 130. The operator B system 150 is shown as including its own access point 160 and access terminal 170 in communication with each other over a separate wireless link 132.

As an example, the access point 110 and the access terminal 120 of the operator A system 100 may communicate via the wireless link 130 in accordance with Long Term Evolution (LTE) technology or a variant thereof (e.g., MuLTEfire, Licensed Assisted Access (LAA), etc.), while the access point 160 and the access terminal 170 of the operator B system 150 may communicate via the wireless link 132 in accordance with the same LTE technology or a different technology (e.g., Wi-Fi technology) but be deployed by a different operator (e.g., a different company or other entity controlling authorization, system timing, etc.). It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the operator A system 100 and the wireless link 132 used by the operator B system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed or lightly licensed frequency band. Although different licensed frequency bands have been reserved for certain communications (e.g., by a government entity such as the Federal Communications Commission (FCC) in the United States), some systems, in particular those employing small cell access points, have extended operation into unlicensed and lightly licensed frequency bands such as such as the Unlicensed National Information Infrastructure (U-NII) band and the Citizens Broadband (CB) Radio Service band.

Due to the shared use of the communication medium 140, there is the potential for cross-link interference between the wireless link 130 and the wireless link 132, particularly if either the operator A system 100 and/or the operator B system 150 does not support Over-The-Air (OTA) co-existence or coordination mechanisms such as contention or "Listen Before Talk (LBT)" for arbitrating access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. While OTA co-existence mechanisms may improve spectral efficiency and therefore overall capacity as compared to a strict operator-based partitioning of the communication medium 140, it may introduce latencies that are undesirable for some applications (e.g., high Quality of Service (QoS) traffic such as voice traffic), and in any event not all operators and devices may support OTA co-existence.

Accordingly, in some designs, a central coordination server 180 such as a Spectrum Access Server (SAS) may be deployed to more intelligently partition the communication medium 140 in order to mitigate the interference. The partitioning may also be adapted as needed (e.g., on a slow time scale or event-driven basis). As shown in FIG. 1, the central coordination server 180 may communicate the partitioning to the operator A system 100 over a respective backhaul link 182 and to the operator B system 150 over a respective backhaul link 184.

Figure 2:
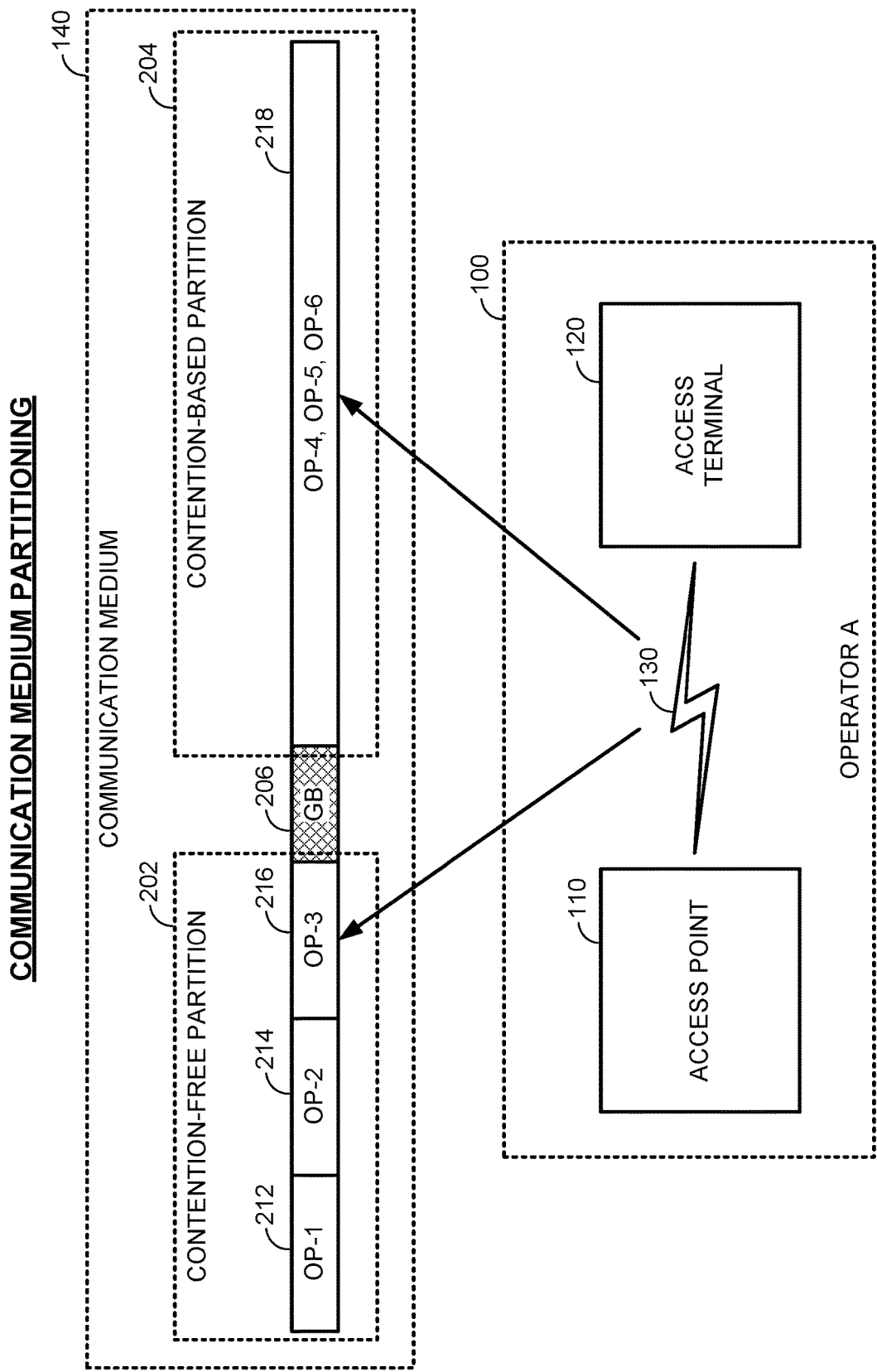
FIG. 2 illustrates an example partitioning scheme that may be implemented on a communication medium.

FIG. 2 illustrates an example partitioning scheme that may be implemented on the communication medium 140. As shown, the communication medium 140 may be generally partitioned by the central coordination server 180 into a contention-free partition 202 in which devices without OTA-contention capabilities may be deployed and a contention-based partition 204 in which devices with OTA-contention capabilities may be deployed. The contention-free partition 202 and the contention-based partition 204 may be separated by a guard band (GB) region 206 to reduce cross-talk interference.

In the illustrated example, the contention-free partition 202 is sub-divided into a first dedicated sub-partition 212 reserved for a first operator (OP-1), a second dedicated sub-partition 214 reserved for a second operator (OP-2), and a third dedicated sub-partition 216 reserved for a third operator (OP-3). The contention-based partition 204 includes one shared partition 218 that is open for contention-based access by a fourth operator (OP-4), a fifth operator (OP-5), and a sixth operator (OP-6). It will be appreciated that the number of operators, the arrangement of the operators, and the relative bandwidths occupied by the different partitions and sub-partitions may be adapted, statically or dynamically, for any given application as desired.

The contention-free partition 202 provides a relatively clean, although reduced bandwidth for the first, second, and third operators. Meanwhile, the contention-based partition 204 provides access to a larger, although less reliable bandwidth for the fourth, fifth, and sixth operators.

Returning to FIG. 2, as a further enhancement, some operators may be deployed so as to occupy resources in both the contention-free partition 202 and the contention-based partition 204 in order to take advantage of the benefits of each. In the illustrated example, the wireless link 130 between the access point 110 and the access terminal 120 of the operator A system 100 may be adapted to communicate over the third dedicated sub-partition 216 of the contention-free partition 202 (e.g., effectively as the third operator (OP-3)) and to also communicate over the shared partition 218 of the contention-based partition 204 (e.g., effectively as the fourth operator (OP-4) as well). In other words, OP-3 and OP-4 may represent the same operator (e.g., operator A) in this example, with operator A allocated both contention-free and contention-based resources between the respective partitions 202 and 204. This mixed-access mode of communication may be implemented in different ways.

Figure 3:
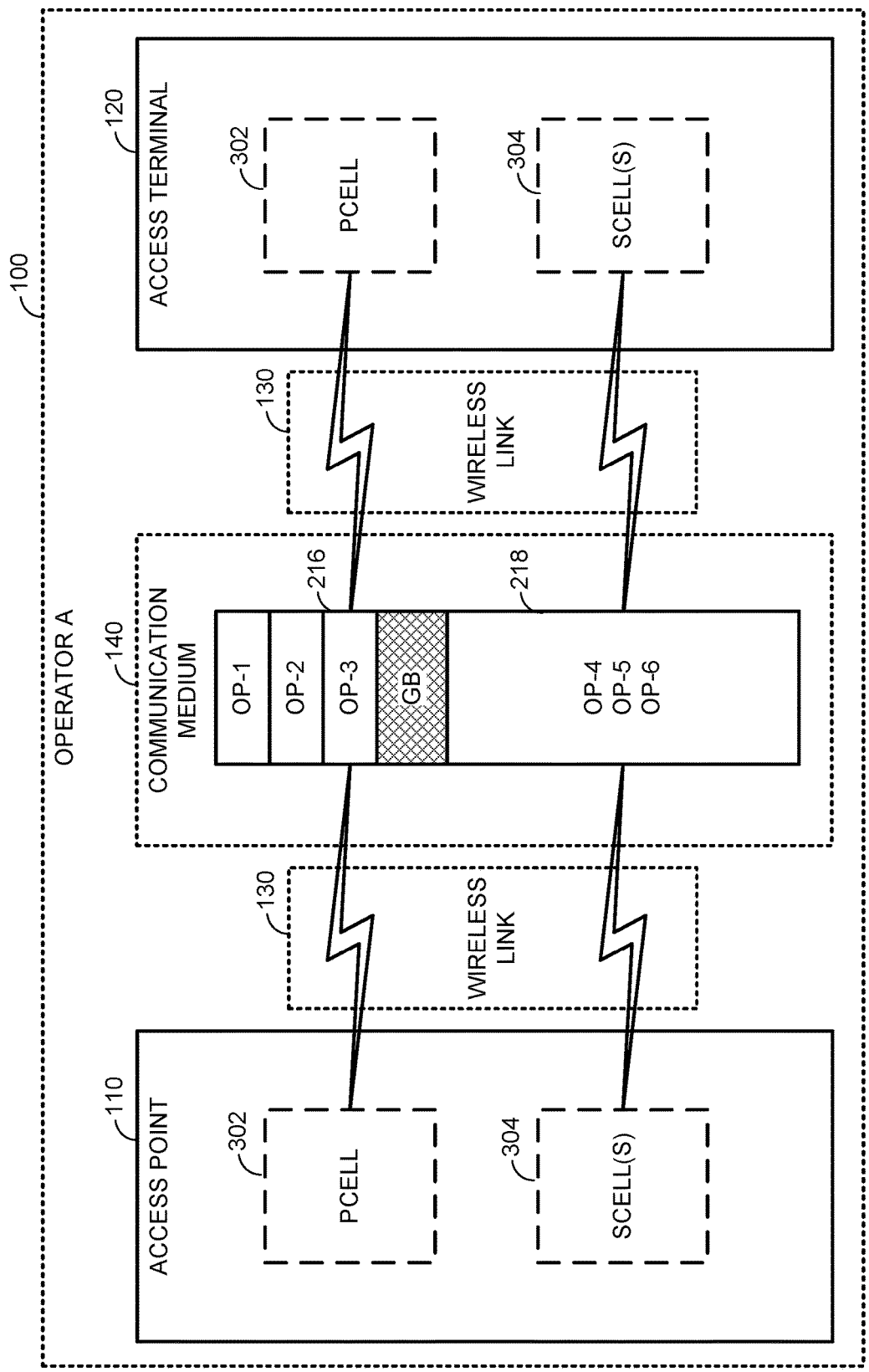
FIG. 3 illustrates an example mixed-access mode communication scheme that may be implemented for a given operator on a communication medium.

FIG. 3 illustrates an example mixed-access mode communication scheme that may be implemented for the operator A system 100 on the communication medium 140. In this example, the access point 110 may operate the wireless link 130 with the access terminal 120 over a plurality of cells, including a Primary Cell (PCell) 302 and one or more Secondary Cells (SCell(s)) 304, on respective component carriers (respective frequencies).

As shown, the PCell 302 connection may operate over the third dedicated sub-partition 216 of the contention-free partition 202, for example, and the one or more SCell(s) 304 connection(s) may operate over the shared partition 218 of the contention-based partition 204. In this way, the PCell 302 may act as an "anchor" carrier similar to a licensed anchor (e.g., as in LAA) and benefit from having significantly reduced interference from other operators. As an example, the PCell 302 may operate using LTE, similar to licensed LTE operation, and the one or more SCell(s) 304 may operate using LAA as an LAA-type SCell. The PCell 302 may therefore be suitable for carrying uplink and downlink control information, QoS-sensitive traffic, other important signaling (e.g., mobility), etc. The one or more SCell(s) 304 may be suitable for carrying other remaining data traffic and providing supplemental capacity for the wireless link 130, which may carry other signaling as needed.

In such a mixed-access mode communication scheme, a relatively small bandwidth may be allocated to the contention-free partition 202 including the PCell 302 and a relatively large bandwidth may be allocated to the contention-based partition 204 including the one or more SCell(s) 304 (e.g., by the central coordination server 180). This may help to improve spectral efficiency and therefore overall capacity by allocating proportionally more bandwidth to the more efficient contention-based partition 204. Moreover, if all operators in a local region utilize this mixed-access mode communication scheme, then an even smaller bandwidth may be allocated to the contention-free partition 202 including the PCell 302 and an even larger bandwidth may be allocated to the contention-based partition 204 including the one or more SCell(s) 304.

For an operator doing mixed mode, some Scell can also be in contention free spectrum.

Figure 4:
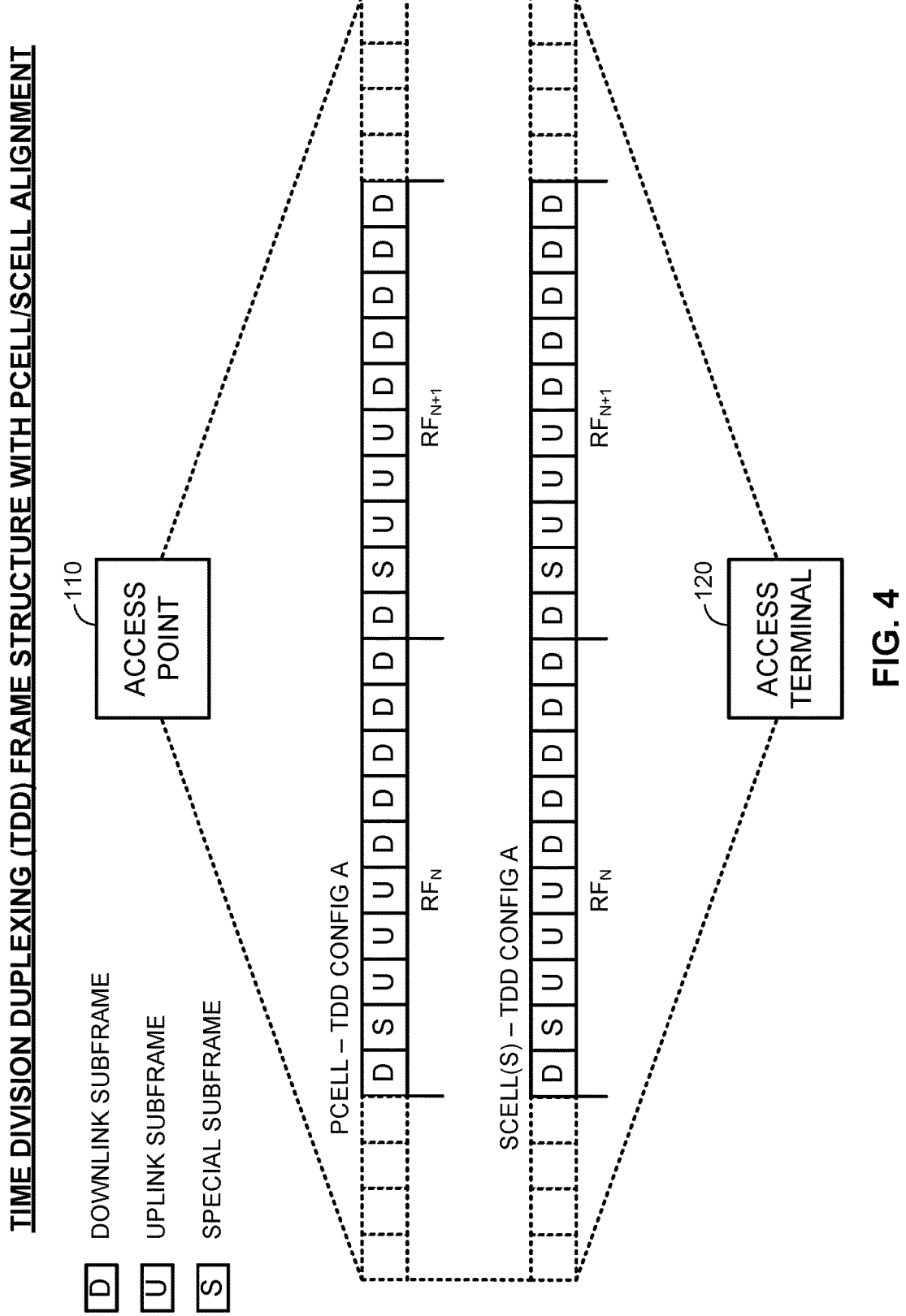
FIG. 4 is a timing diagram illustrating an example Time Division Duplex (TDD) frame structure that may be implemented for a given operator on a communication medium.

FIG. 4 is a timing diagram illustrating an example Time Division Duplex (TDD) frame structure that may be implemented for the operator A system 100 on the communication medium 140.

In general, both the PCell 302 and the one or more SCell(s) 304 may be divided in the time-domain into a series of radio frames (RFs) and respective subframes (SFs). As an example, the LTE frame structure includes system frames that are divided into 1024 numbered radio frames composed of 10 subframes each, which together constitute a system frame cycle (e.g., lasting 10.24 s for 10 ms radio frames having 1 ms subframes).

The example frame structure of FIG. 4 is TDD in that each subframe may be variously operated at different times as a downlink (D), uplink (U), or special (S) subframe. In general, downlink subframes are reserved for transmitting downlink information (e.g., from the access point 110 to the access terminal 120), uplink subframes are reserved for transmitting uplink information (e.g., from the access terminal 120 to the access point 110), and special subframes may include a downlink portion and an uplink portion separated by a guard period. Different arrangements of downlink, uplink, and special subframes may be referred to as different TDD configurations. Returning to the LTE example above, the TDD variant of the LTE frame structure includes 7 TDD configurations (TDD Config 0 through TDD Config 6), with each configuration having a different arrangement of downlink, uplink, and special subframes. For example, some TDD configurations may have more downlink subframes and some may have more uplink subframes to accommodate different traffic scenarios. In the illustrated example of FIG. 4, a TDD configuration is employed that is similar to TDD Config 3 in LTE.

Returning to FIG. 4, in the illustrated example, the TDD configurations for the PCell 302 and the one or more SCell(s) 304 are synchronized to a common TDD configuration (TDD Config 'A') to avoid self-interference. Although some technologies such as MuLTEfire may permit a more flexible frame structure, a synchronized and thus fixed TDD configuration may help to reduce interference for the PCell 302 while still providing a wider bandwidth for the one or more SCell(s) 304.

For the contention-based partition 204, the access point 110 may contend for access to the communication medium 140 for the one or more SCell(s) 304 based on the location of the downlink subframes within the frame structure. The access terminal 120 may similarly contend for access to the communication medium 140, as needed, based on the location of the uplink subframes within the frame structure.

Moreover, the same TDD configuration may be assigned to multiple operators (e.g., to both the operator A system 100 and the operator B system 150), such that, in some designs or scenarios, essentially the entire communication medium 140 may be operated with the same TDD configuration across different operators' PCells and SCells.

Figure 5:
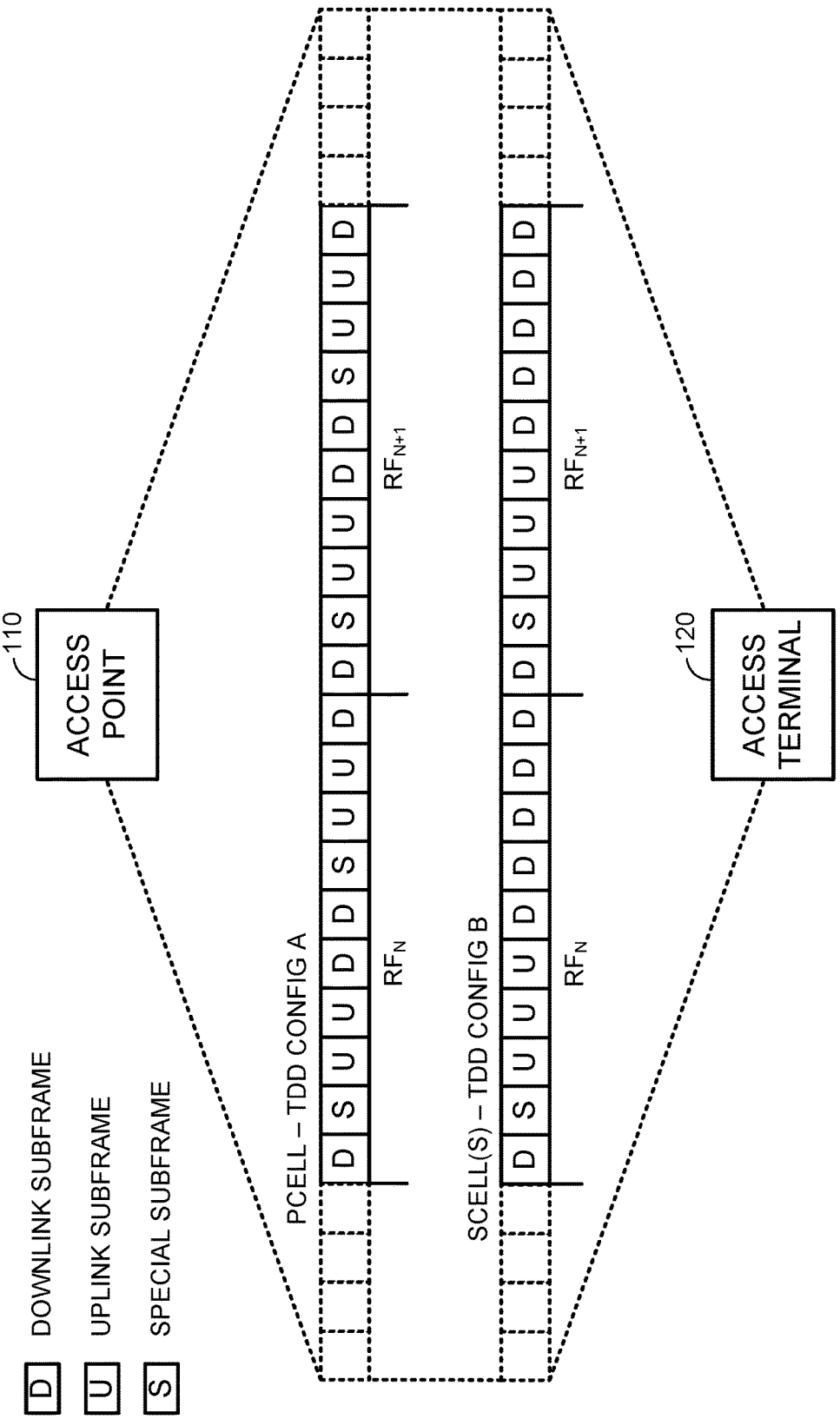
FIG. 5 is another timing diagram illustrating another example TDD frame structure that may be implemented for a given operator on a communication medium.

FIG. 5 is another timing diagram illustrating another example TDD frame structure that may be implemented for the operator A system 100 on the communication medium 140. As in the example of FIG. 4, both the PCell 302 and the one or more SCell(s) 304 may be divided in the time-domain into a defined sequence or series of radio frames (RFs) and respective subframes (SFs) organized into a TDD configuration having a given arrangement of downlink, uplink, and special subframes.

In this example, however, the PCell 302 and the one or more SCell(s) 304 may operate in accordance with different TDD configurations (TDD Config 'A' or 'B'). For example, the PCell 302 may employ a TDD configuration similar to TDD Config 1 in LTE while the one or more SCell(s) 304 may employ a TDD configuration similar to TDD Config 3 in LTE. Or, the TDD configuration of the one or more SCell(s) 304 may be completely flexible, as in MuLTEfire or Embedded Linus & Android Alliance (eLAA), where it can be dynamically changed every transmission burst by the access point 110.

This design may be suitable when the communication medium 140 encompasses two different frequency bands (e.g., the 3.5 GHz CB band and the 5 GHz UNII band), or, more generally, when the guard band (GB) region 206 is sufficiently large (e.g., above a threshold) so as to substantially isolate the contention-free partition 202 and the contention-based partition 204 from downlink-to-uplink or uplink-to-downlink cross-talk interference. Thus, the TDD configuration of the one or more SCell(s) 304 may be fixed or adaptive depending on the separation between the contention-free partition 202 and the contention-based partition 204.

Figure 6:
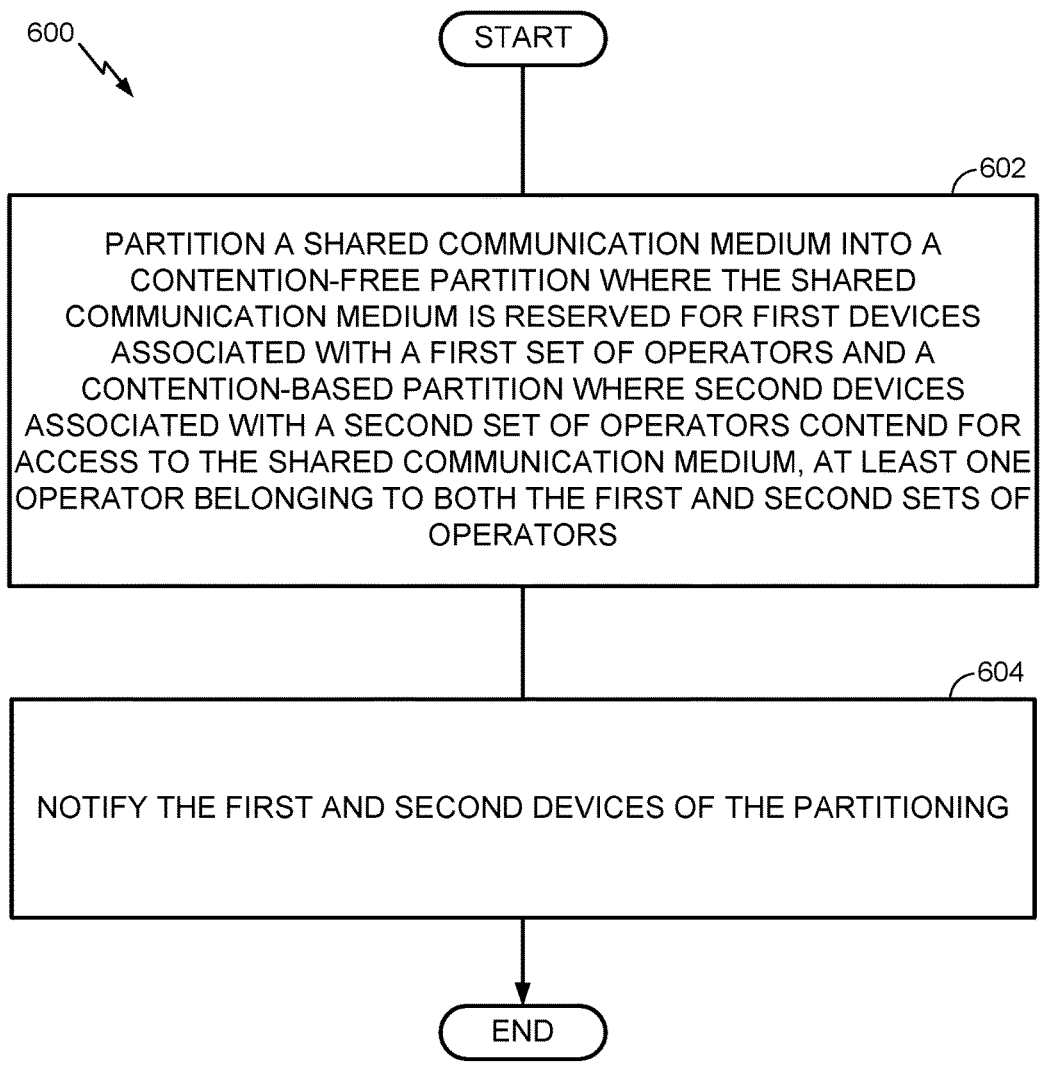
FIG. 6 is a flow diagram illustrating an example method of communication in accordance with an embodiment of the disclosure.

FIG. 6 is a flow diagram illustrating an example method 600 of communication in accordance with the techniques described above. The method 600 may be performed, for example, by a central coordination server (e.g., the central coordination server 180 illustrated in FIG. 1), such as an SAS.

As shown, the central coordination server may partition a shared communication medium (e.g., shared communication medium 140) into a contention-free partition (e.g., contention-free partition 202 of FIG. 2) where the shared communication medium is reserved for devices (e.g., access point 110 and/or access terminal 120) associated with a first set of operators (e.g., OP-1, OP-2 and OP-3 in FIGS. 2-3) and a contention-based partition (e.g., contention-based partition 204 of FIG. 2) where devices (e.g., access point 110 and/or access terminal 120) associated with a second set of operators (e.g., OP-4, OP-5 and OP-6 in FIGS. 2-3) contend for access to the shared communication medium in accordance with a contention-based protocol (e.g., such as carrier-sense multiple access or CSMA) (block 602). Moreover, at least one operator belongs to both the first and second sets of operators, as described above with respect to operator A in FIGS. 2-3.

Referring to FIG. 6, the central coordination server may notify (either directly or indirectly) the devices associated with the first set of operators and the devices associated with the second set of operators of the partitioning (block 604). For example, the notification(s) of block 604 may convey which dedicated sub-partitions among the contention-free period are allocated to particular operators, and may convey which operators are permitted to contend for access to the shared communication medium in accordance with the contention-based protocol. The notification(s) of block 604 may be forwarded over the backhaul link 182 and/or the backhaul link 184 of FIG. 1.

Figure 7:
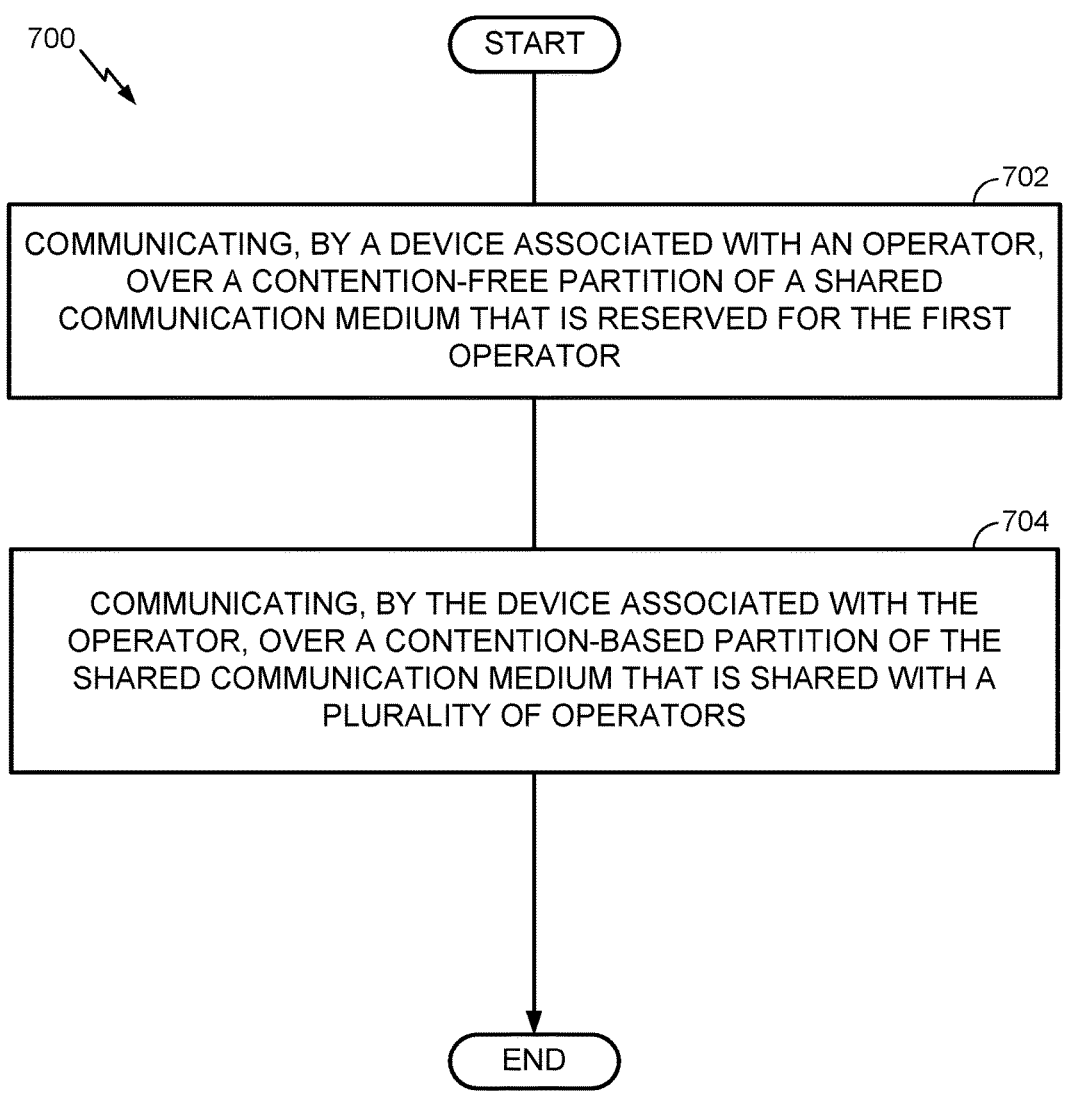
FIG. 7 is a flow diagram illustrating an example method of communication in accordance with another embodiment of the disclosure.

FIG. 7 is a flow diagram illustrating an example method 700 of communication in accordance with the techniques described above. The method 700 may be performed, for example, by an access point (e.g., the access point 110 illustrated in FIG. 1) or an access terminal (e.g., the access terminal 120 illustrated in FIG. 1) operating on a shared communication medium.

As shown, the access point or access terminal may communicate, in association with a first operator, over a contention-free partition of a shared communication medium that is reserved for the first operator (block 702). The access point or access terminal may also communicate, in association with the first operator, over a contention-based partition of the shared communication medium that is shared with a plurality of operators (block 704). For example, the first operator with respect to FIG. 7 may correspond to operator A as described above with respect to FIGS. 2-3.

As an example, the communicating over the contention-free partition (block 702) may comprise communicating via a PCell and the communicating over the contention-based partition (block 704) may comprise communicating via one or more SCell(s). Further, the communications that occur at blocks 702 and 704 in FIG. 7 may occur in response to a partition notification from a central coordination server, as described above with respect to block 604 of FIG. 6.

For generality, the access point 110 and the access terminal 120 are shown in FIG. 1 only in relevant part. It will be appreciated, however, that the access point 110 and the access terminal 120 may be configured in various ways to provide or otherwise support the mixed-access mode communication techniques discussed herein.

Figure 8:
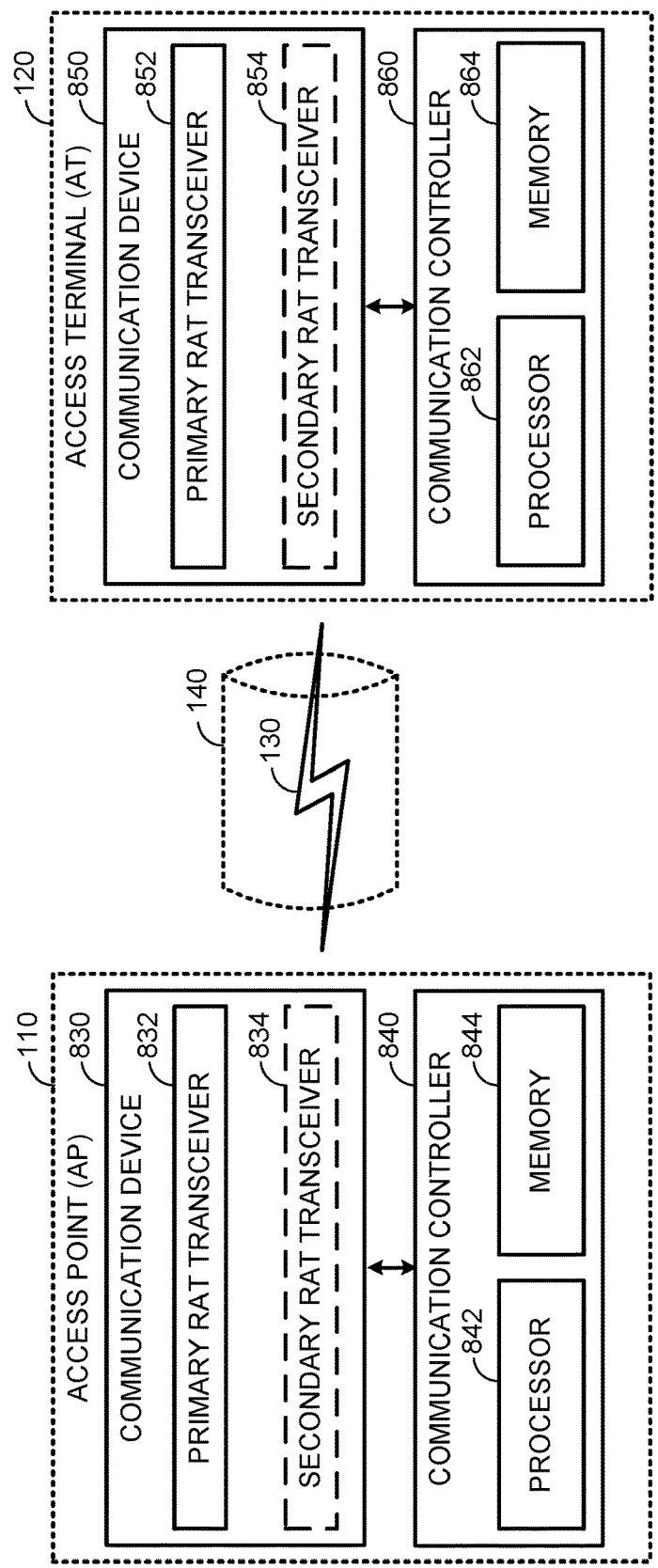
FIG. 8 is a device-level diagram illustrating example components of an access point and an access terminal of a primary RAT system in accordance with an embodiment of the disclosure.

FIG. 8 is a device-level diagram illustrating example components of the access point 110 and the access terminal 120 of the operator A system 100 in more detail. As shown, the access point 110 and the access terminal 120 may each generally include a wireless communication device (represented by the communication devices 830 and 850) for communicating with other wireless nodes via at least one designated RAT. The communication devices 830 and 850 may be variously configured for transmitting and encoding signals, and, conversely, for receiving and decoding signals in accordance with the designated RAT (e.g., messages, indications, information, pilots, and so on).

The communication devices 830 and 850 may include, for example, one or more transceivers, such as respective primary RAT transceivers 832 and 852, and, in some designs, (optional) co-located secondary RAT transceivers 834 and 854, respectively (corresponding, for example, to the RAT employed by the operator B system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 840 and 860) for controlling operation of their respective communication devices 830 and 850 (e.g., directing, modifying, enabling, disabling, etc.). The communication controllers 840 and 860 may include one or more processors 842 and 862, and one or more memories 844 and 864 coupled to the processors 842 and 862, respectively. The memories 844 and 864 may be configured to store data, instructions, or a combination thereof, either as on-board cache memory, as separate components, a combination, etc. The processors 842 and 862 and the memories 844 and 864 may be standalone communication components or may be part of the respective host system functionality of the access point 110 and the access terminal 120.

Accordingly, it will be appreciated that the components in FIG. 8 may be used to perform operations described above with respect to FIGS. 1-5 and 7. For example, the access point 110 may communicate, via the primary RAT transceiver 832 and in association with a first operator, over a contention-free partition of a shared communication medium that is reserved for the first operator. The access point 110 may also communicate, via the primary RAT transceiver 832 and in association with the first operator, over a contention-based partition of the shared communication medium that is shared with a plurality of operators.

As another example, the access terminal 120 may communicate, via the primary RAT transceiver 852 and in association with a first operator, over a contention-free partition of a shared communication medium that is reserved for the first operator. The access terminal 120 may also communicate, via the primary RAT transceiver 852 and in association with the first operator, over a contention-based partition of the shared communication medium that is shared with a plurality of operators.

Figure 9:
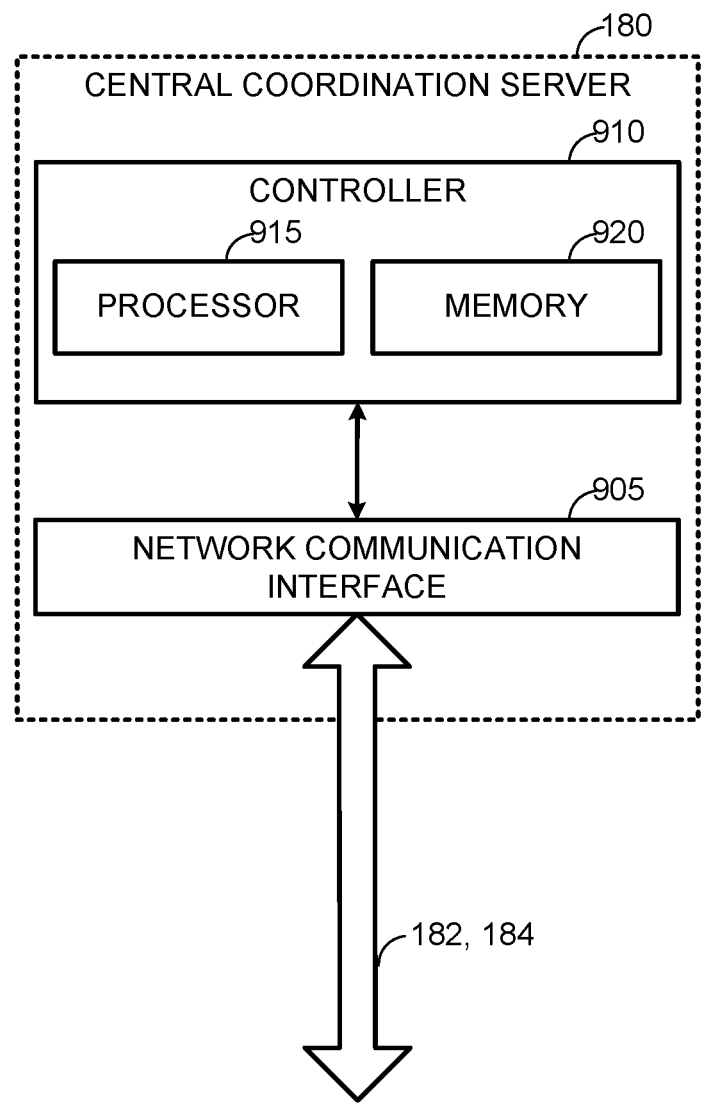
FIG. 9 is a device-level diagram illustrating example components of a central coordination server in accordance with an embodiment of the disclosure.

FIG. 9 is a device-level diagram illustrating example components of the central coordination server 180 (e.g., an SAS) in more detail. As shown, the central coordination server 180 may include a wireless communication device (represented by the communication devices 830 and 850) a network communication interface 905, which may be used to communicate over the backhaul links 182-184 described above with respect to FIG. 1. In an example, the network communication interface 905 may be a wired transceiver component (e.g., an Ethernet card or network switch).

Referring to FIG. 9, the central coordination server 180 further includes a controller 910 for controlling operation of the central coordination server 180 (e.g., directing, modifying, enabling, disabling, etc.). The controller 910 may include at least one processor 915 and a memory 920 coupled to the at least one processor 915. The memory 920 may be configured to store data, instructions, or a combination thereof, either as on-board cache memory, as separate components, a combination, etc.

Accordingly, it will be appreciated that the components in FIG. 9 may be used to perform operations described above with respect to FIGS. 1-6. For example, the central coordination server 180 may, via the controller 910, partition a shared communication medium into a contention-free partition where the shared communication medium is reserved for devices associated with a first set of operators and a contention-based partition where devices associated with a second set of operators contend for access to the shared communication medium in accordance with a contention-based protocol, at least one operator belonging to both the first and second sets of operators. The central coordination server 180 may further, via the network communication interface 905, notify the devices associated with the first set of operators and the devices associated with the second set of operators of the partitioning.

Figure 10:
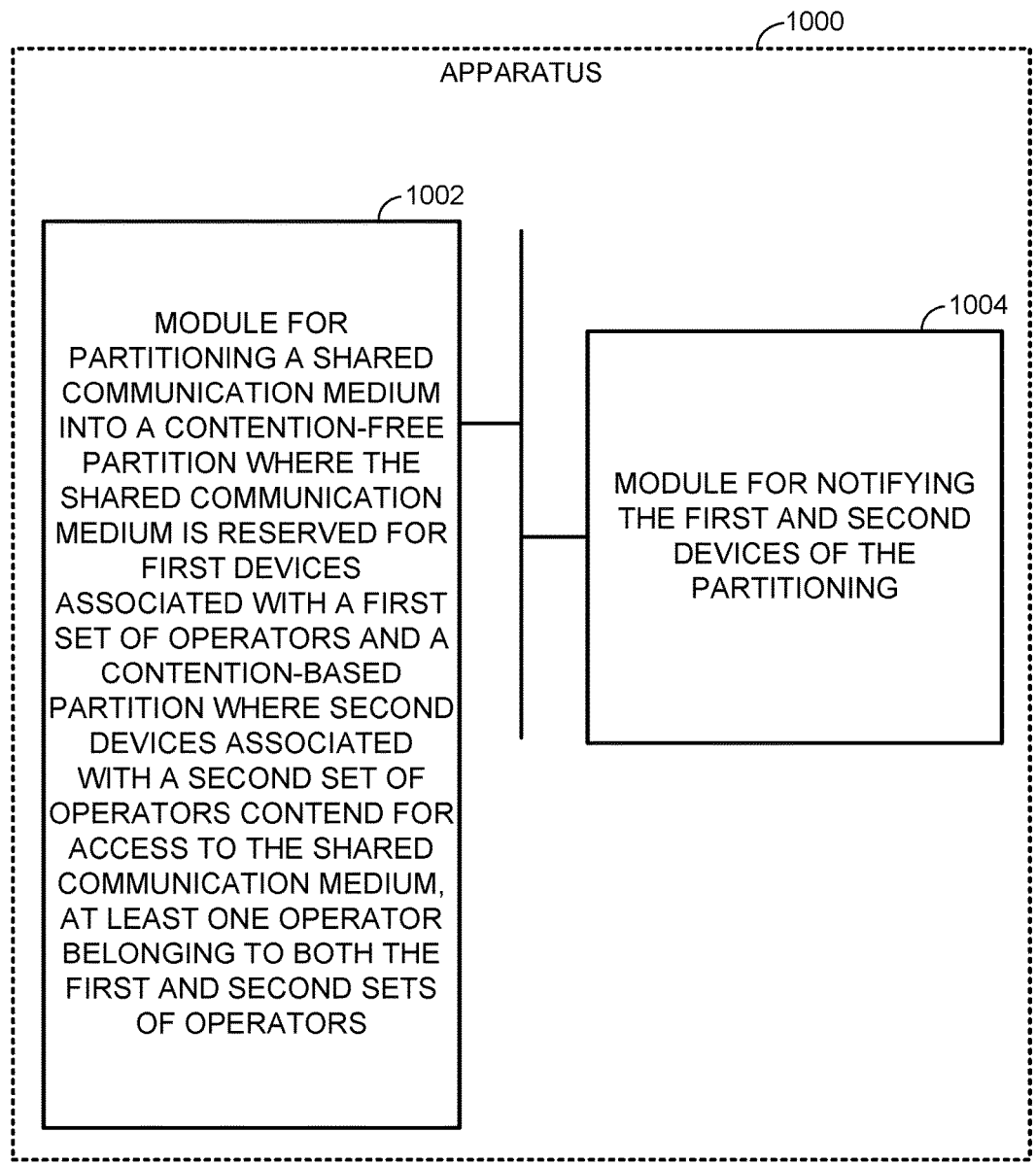
FIG. 10 illustrates an example apparatus for implementing mixed-access mode communication techniques at a central coordination server represented as a series of interrelated functional modules in accordance with an embodiment of the disclosure.

FIG. 10 illustrates an example apparatus for implementing the mixed-access mode communication techniques discussed herein at a central coordination server represented as a series of interrelated functional modules. In the illustrated example, the apparatus 1000 includes a module for partitioning 1002 and a module for notifying 1004.

The module for partitioning 1002 may be configured to partition a shared communication medium into a contention-free partition where the shared communication medium is reserved for devices associated with a first set of operators and a contention-based partition where devices associated with a second set of operators contend for access to the shared communication medium in accordance with a contention-based protocol, at least one operator belonging to both the first and second sets of operators. The module for notifying 1004 may be configured to notify the devices associated with the first set of operators and the devices associated with the second set of operators of the partitioning.

Figure 11:
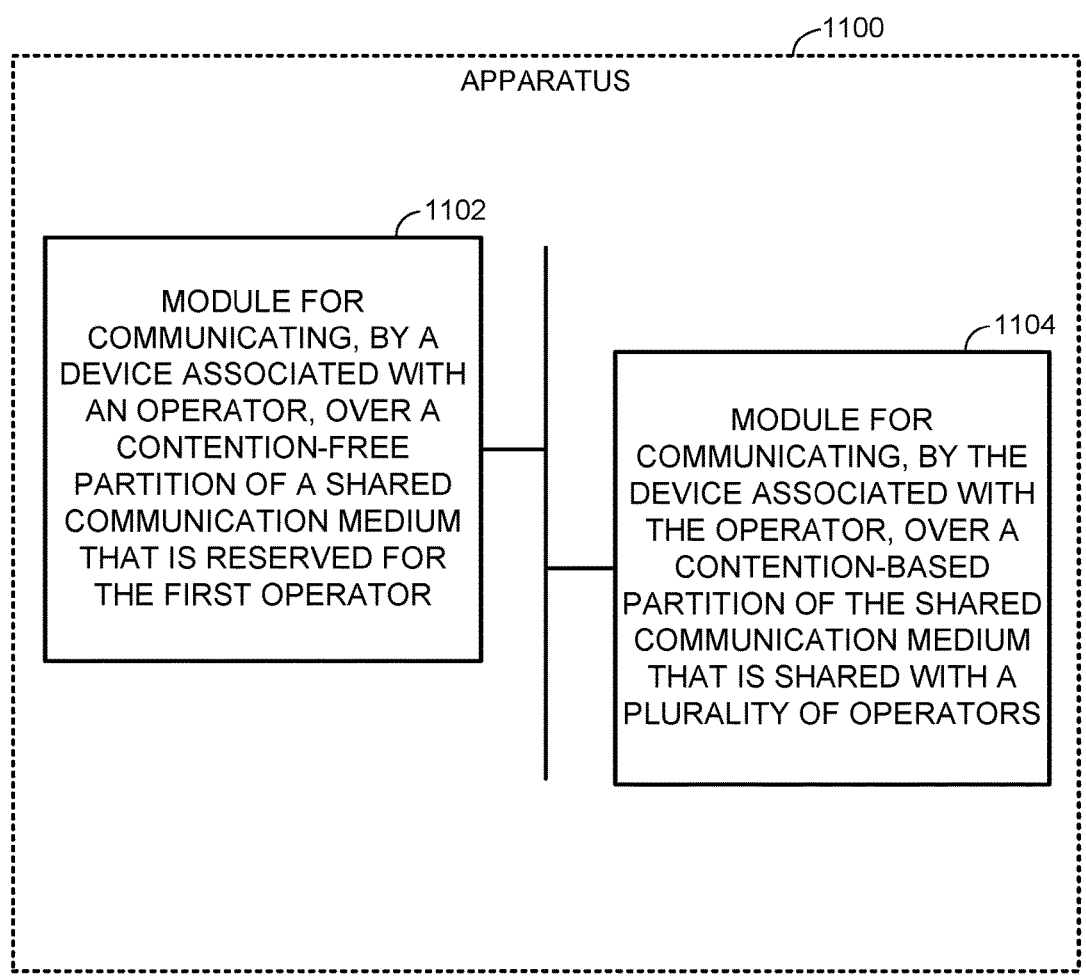
FIG. 11 illustrates an example apparatus for implementing mixed-access mode communication techniques at an access point and/or an access terminal represented as a series of interrelated functional modules in accordance with an embodiment of the disclosure.

FIG. 11 illustrates an example apparatus for implementing the mixed-access mode communication techniques discussed herein at an access point and/or an access terminal represented as a series of interrelated functional modules. In the illustrated example, the apparatus 1100 includes a module for communicating 1102 and a module for communicating 1104.

The module for communicating 1102 may be configured to communicate, in association with a first operator, over a contention-free partition of a shared communication medium that is reserved for the first operator. The module for communicating 1104 may be configured to communicate, in association with the first operator, over a contention-based partition of the shared communication medium that is shared with a plurality of operators.

The functionality of the modules of FIGS. 10-11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 10-11, as well as other components and functions described herein, may be implemented using any suitable means. Such means also may be implemented, at least in part, using corresponding structure as taught herein. For example, the components described above in conjunction with the "module for" components of FIGS. 10-11 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well as in sequences of actions that may be represented by pseudocode. For example, the components and functions represented by FIGS. 10-11 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of operating a central coordination server for a shared communication medium, comprising:
   partitioning the shared communication medium into a
      contention-free partition where the shared communication medium is reserved for first devices associated with a first set of operators and a contention-based partition where second devices associated with a second set of operators contend for access to the shared communication medium in accordance with an Over-the-Air (OTA) coexistence mechanism, at least one operator belonging to both the first and second sets of operators; and notifying the first and second devices of the partitioning,
wherein the contention-free partition and the contention-based partition each correspond at least in part to an unlicensed communication medium, wherein at least one dedicated sub-partition in the contention-free partition is reserved as at least one anchor carrier for at least one Primary Cell (PCell) of the at least one operator, and wherein at least one Secondary Cell (SCell) of the at least one operator is supported by contention-based resources among the contention-based partition.

2. The method of claim 1, wherein the central coordination server corresponds to a Spectrum Access Server (SAS).

3. The method of claim 1, wherein the first and second devices include access terminals, access points, or a combination thereof.

4. The method of claim 1, wherein the at least one anchor carrier for the at least one PCell of the at least one operator is configured to carry uplink and downlink control information, QoS-sensitive traffic, mobility signaling, or any combination thereof.

5. The method of claim 1, wherein a PCell and one or more SCells for a respective operator among the at least one operator are synchronized to a common Time Division Duplex (TDD) configuration, the common TDD configuration including a defined sequence of radio frames (RFs) and respective subframes (SFs).

6. The method of claim 1, wherein a PCell and one or more SCells for a respective operator among the at least one operator are configured with different Time Division Duplex (TDD) configurations that include different sequences of radio frames (RFs) and respective subframes (SFs).

7. The method of claim 6, wherein the partitioning allocates the different TDD configurations to the PCell and the one or more SCells based on a guard band (GB) region between the PCell and the one or more SCells being above a threshold.

8. The method of claim 1, wherein the partitioning allocates more bandwidth to the contention-based partition than the contention-free partition.

9. A communication method, comprising:
communicating, by a device associated with an operator, over a contention-free partition of a shared communication medium that is reserved for the operator; and
communicating, by the device associated with the operator in accordance with an Over-the-Air (OTA) coexistence mechanism, over a contention-based partition of the shared communication medium that is shared with a plurality of operators,
wherein the contention-free partition and the contention-based partition each correspond at least in part to an unlicensed communication medium,
wherein the communicating over the contention-free partition communicates as an anchor carrier for a Primary Cell (PCell) of the operator, and
wherein the communicating over the contention-based partition communicates as one or more Secondary Cell (SCells).

10. The method of claim 9,
wherein the communicating over the contention-free partition occurs on a dedicated sub-partition of the contention-free partition, further comprising:
receiving, from a central coordination server, a notification that indicates the reservation of the dedicated sub-partition of the contention-free partition for the device, and further indicates that the device is permitted to contend for access to the contention-based partition of the shared communication medium.

11. The method of claim 10, wherein the central coordination server corresponds to a Spectrum Access Server (SAS).

12. The method of claim 9, wherein the device is an access point or an access terminal.

13. The method of claim 9, wherein the communicating over the contention-free partition communicates uplink and downlink control information, QoS-sensitive traffic, mobility signaling, or any combination thereof.

14. The method of claim 9, wherein the PCell and the one or more SCells are synchronized to a common Time Division Duplex (TDD) configuration, the common TDD configuration including a defined sequence of radio frames (RFs) and respective subframes (SFs).

15. The method of claim 9, wherein the PCell and the one or more SCells are configured with different Time Division Duplex (TDD) configurations that include different sequences of radio frames (RFs) and respective subframes (SFs).

16. The method of claim 9, where the contention-based partition includes a larger bandwidth than the contention-free partition.

17. A central coordination server for a shared communication medium, comprising:
a controller coupled to a network communication interface and configured to:
partition the shared communication medium into a contention-free partition where the shared communication medium is reserved for first devices associated with a first set of operators and a contention-based partition where second devices associated with a second set of operators contend for access to the shared communication medium in accordance with an Over-the-Air (OTA) coexistence mechanism, at least one operator belonging to both the first and second sets of operators; and
notify the first and second devices of the partitioning,
wherein the contention-free partition and the contention-based partition each correspond at least in part to an unlicensed communication medium,
wherein at least one dedicated sub-partition in the contention-free partition is reserved as at least one anchor carrier for at least one Primary Cell (PCell) of the at least one operator, and
wherein at least one Secondary Cell (SCell) of the at least one operator is supported by contention-based resources among the contention-based partition.

18. The central coordination server of claim 17, wherein the central coordination server corresponds to a Spectrum Access Server (SAS).

19. The central coordination server of claim 17, wherein the first and second devices include access terminals, access points, or a combination thereof.

20. The central coordination server of claim 17, wherein a PCell and one or more SCells for a respective operator among the at least one operator are synchronized to a common Time Division Duplex (TDD) configuration, the common TDD configuration including a defined sequence of radio frames (RFs) and respective subframes (SFs).

21. The central coordination server of claim 17, wherein a PCell and one or more SCells for a respective operator among the at least one operator are configured with different Time Division Duplex (TDD) configurations that include different sequences of radio frames (RFs) and respective subframes (SFs).

22. The central coordination server of claim 21, wherein the controller allocates the different TDD configurations to the PCell and the one or more SCells based on a guard band (GB) region between the PCell and the one or more SCells being above a threshold.

23. A device associated with an operator, comprising:
at least one communication controller coupled to at least one transceiver and configured to:
communicate over a contention-free partition of a shared communication medium that is reserved for the operator; and
communicate, in accordance with an Over-the-Air (OTA) coexistence mechanism, over a contention-based partition of the shared communication medium that is shared with a plurality of operators,
wherein the contention-free partition and the contention-based partition each correspond at least in part to an unlicensed communication medium,
wherein the at least one communication controller is configured to communicate over the contention-free partition as an anchor carrier for a Primary Cell (PCell) of the operator, and
wherein the at least one communication controller is configured to communicate over the contention-based partition communicates as one or more Secondary Cell (SCells).

24. The device of claim 23,
wherein the at least one communication controller is configured to communicate over the contention-free partition on a dedicated sub-partition of the contention-free partition, and
wherein the at least one communication controller is further configured to receive, from a central coordination server, a notification that indicates the reservation of the dedicated sub-partition of the contention-free partition for the device, and further indicates that the device is permitted to contend for access to the contention-based partition of the shared communication medium.

25. The device of claim 23, wherein the device is an access point or an access terminal.

26. The device of claim 23,
wherein the PCell and the one or more SCells are synchronized to a common Time Division Duplex (TDD) configuration, the common TDD configuration including a defined sequence of radio frames (RFs) and respective subframes (SFs), or
wherein the PCell and the one or more SCells are configured with different Time Division Duplex (TDD) configurations that include different sequences of radio frames (RFs) and respective subframes (SFs).

* * * * *